United States Patent [19]
Christiansen et al.

[11] 4,348,353
[45] Sep. 7, 1982

[54] NUCLEAR REACTOR FUEL ASSEMBLY DUCT-TUBE-TO-INLET-NOZZLE ATTACHMENT SYSTEM

[75] Inventors: David W. Christiansen; Bob G. Smith, both of Kennewick, Wash.

[73] Assignee: The United States of America as represented by the United States Department of Energy, Washington, D.C.

[21] Appl. No.: 206,231

[22] Filed: Nov. 12, 1980

[51] Int. Cl.³ ............................................. G21C 15/00
[52] U.S. Cl. .................................. 376/364; 376/352; 376/362; 376/399; 376/439; 376/443
[58] Field of Search ............... 376/364, 352, 362, 399, 376/439, 443

[56] References Cited

U.S. PATENT DOCUMENTS

| | | |
|---|---|---|
| 2,728,895 | 12/1955 | Quackenbush . |
| 3,163,585 | 12/1964 | Metcalfe . |
| 3,165,349 | 1/1965 | Costes .................................. 376/364 |
| 3,240,681 | 3/1966 | Waine . |
| 3,623,753 | 11/1971 | Henry . |
| 3,743,578 | 7/1973 | Agranier . |
| 3,755,077 | 8/1973 | Agranier . |
| 3,775,249 | 11/1973 | Clapham . |
| 3,802,996 | 4/1974 | Jones . |
| 3,971,698 | 7/1976 | Wolff .................................. 376/364 |
| 4,003,787 | 1/1977 | Marmonier . |
| 4,017,357 | 4/1977 | Patterson ............................ 376/364 |
| 4,038,133 | 7/1977 | Bittermann ......................... 376/364 |
| 4,045,287 | 8/1977 | Santen . |
| 4,050,986 | 9/1977 | Ference .............................. 376/364 |
| 4,194,948 | 3/1980 | Ledin .................................. 376/364 |

Primary Examiner—Donald P. Walsh
Attorney, Agent, or Firm—Douglas E. Erickson; Richard E. Constant; Richard G. Besha

[57] ABSTRACT

A reusable system for removably attaching the lower end 21 of a nuclear reactor fuel assembly duct tube to an upper end 11 of a nuclear reactor fuel assembly inlet nozzle. The duct tube's lower end 21 has sides terminating in locking tabs 22 which end in inwardly-extending flanges 23. The flanges 23 engage recesses 13 in the top section 12 of the inlet nozzle's upper end 11. A retaining collar 30 slides over the inlet nozzle's upper end 11 to restrain the flanges 23 in the recesses 13. A locking nut 40 has an inside threaded portion 41 which engages an outside threaded portion 15 of the inlet nozzle's upper end 11 to secure the retaining collar 30 against protrusions 24 on the duct tube's sides.

9 Claims, 10 Drawing Figures

Fig. 8B

NUCLEAR REACTOR FUEL ASSEMBLY DUCT-TUBE-TO-INLET-NOZZLE ATTACHMENT SYSTEM

The United States Government has rights in this invention pursuant to contract No. EY-76-C-14-2170 between the U.S. Department of Energy and the Westinghouse Hanford Company.

BACKGROUND OF THE INVENTION

The present invention relates generally to nuclear reactor fuel assemblies and more particularly to a reusable system for removably attaching a nuclear reactor fuel assembly duct tube to a nuclear reactor fuel assembly inlet nozzle.

To produce power from the nuclear reactor, it is necessary to assemble a concentration of fissionable uranium, thorium, and/or plutonium in a quantity and in a physical configuration capable of sustaining a continuous sequence of fission reactions. This concentration is frequently referred to as the reactor core. The heat that the fission reactions generate is transferred to a fluid such as, for example, liquid sodium. The sodium, in turn, transfers its heat to a secondary coolant, or ultimate coolant, which can be used to drive turbines which power electrical generation equipment.

Because the radiation, pressure, temperature, flow velocity, and other environmental conditions within the reactor core are quite hostile, the reactor core must be of sturdy construction. These conditions produce a number of phenomena with which it is very difficult to cope. Thus, for example, thermal, pressure, and irradiation effects tend to produce considerable creep in materials which can expand dimensions, cause bow and other effects which shorten fuel assembly life. Also, due to varying material requirements throughout a reactor core, it is often difficult to achieve ideal fuel behavior due to fabrication constraints. These effects have been known to produce a type of deterioration in that dimensional constraints of a fuel assembly in a reactor core can no longer be met over a period of time.

These conflicting requirements have been reconciled to a great extent by loading pellets of uranium or plutonium dioxide into long slender tubes called fuel rods. With the tubes loaded with pellets and the ends of each tube sealed, these fuel rods are arranged longitudinally parallel with each other and are arranged in generally hexagonal arrays of about 200 fuel rods. Each array is called a fuel assembly. These fuel assemblies all are mounted side-by-side in a larger, generally right circular cylindrical configuration that characterizes the reactor core.

Each fuel assembly often includes an upper handling socket and a lower nozzle which are both attached to a duct tube containing the fuel rods. The fuel rods receive radial support from the duct tube and longitudinal support from the lower nozzle. Coolant usually flows in through the lower or inlet nozzle of the fuel assembly, up through the spaces between fuel rods and out through the upper handling socket of the fuel assembly.

Often, duct material incompatibility with the environment can degrade the operating life expectancy of the fuel assembly. This gives a need, with a significant cost incentive, for being able to remove duct tubes from their inlet nozzles for various reasons such as inspection, testing, maintenance or replacement, without the destruction of the duct tube and/or inlet nozzle.

The prior art attaches the duct tube to the inlet nozzle by welding, and uses destructive techniques to separate them.

SUMMARY OF THE INVENTION

It is an object of the invention to quickly and inexpensively attach a nuclear reactor fuel assembly duct tube to a nuclear reactor fuel assembly inlet nozzle.

It is another object of the invention to quickly, inexpensively and nondestructively remove an attached nuclear reactor fuel assembly duct tube from a nuclear reactor fuel assembly inlet nozzle.

It is a further object of the invention to allow repeated attachment and removal of a nuclear reactor fuel assembly duct tube and a nuclear reactor fuel assembly inlet nozzle.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the nuclear reactor fuel assembly duct tube and inlet nozzle attachment and removal system may comprise a nuclear reactor fuel assembly inlet nozzle, a nuclear reactor fuel assembly duct tube, a retaining collar and a locking nut. The inlet nozzle's upper end has a top section with the shape of a generally equilateral polygon and a bottom section with the general shape of a cylinder. The two sections are coaxially joined. Each top section's side contains an outside recess while the bottom section contains outside threads. The duct tube's lower end has a similar shape to that of the previously mentioned polygon, and its sides have outwardly-extending protrusions followed by terminal deflectable locking tabs which end in inwardly-extending flanges. The locking tabs can be made to slide over the inlet nozzle's top section, and the flanges can be made to engage the top section's recesses. The retaining collar's top segment has a shape similar to that of the previously mentioned polygon and its bottom segment has a generally cylindrical shape. The two segments are coaxially joined. The top segment, during attachment, surrounds and restrains the flanges and engages the protrusions. The bottom segment, during attachment, is positioned above only part of the outside threaded portion. The locking nut's inside threaded portion connects with the outside threaded portion of the inlet nozzle to lock the retaining collar against the protrusions during attachment.

Several benefits and advantages are derived from the invention. The invention's rapid attachment and removal feature allows easy removal of a nuclear reactor fuel assembly duct tube from its inlet nozzle for inspection, testing, maintenance and the like. The invention's reusability feature allows the removed duct tube and/or inlet nozzle to be reconnected or replaced with a different one. This is to be contrasted with the prior art which provides for a destructive, one-time removal system. The invention's reusability feature and rapid attachment and removal feature provide an economic benefit for test and/or commercial reactors. For example, various duct tube material configurations can be tested without degrading fuel assembly life and the limited life of assemblies could be extended.

BRIEF DESCRIPTION OF THE DRAWINGS

The accompanying drawings which are incorporated in and form a part of this specification, illustrate an embodiment of the present invention and, together with a description, serve to explain the principles of the invention. In the drawing.

DETAILED DESCRIPTION OF THE INVENTION

Reference will now be made in detail to the present preferred embodiment of the invention, an example of which is illustrated in the accompanying drawings.

Figure 1:
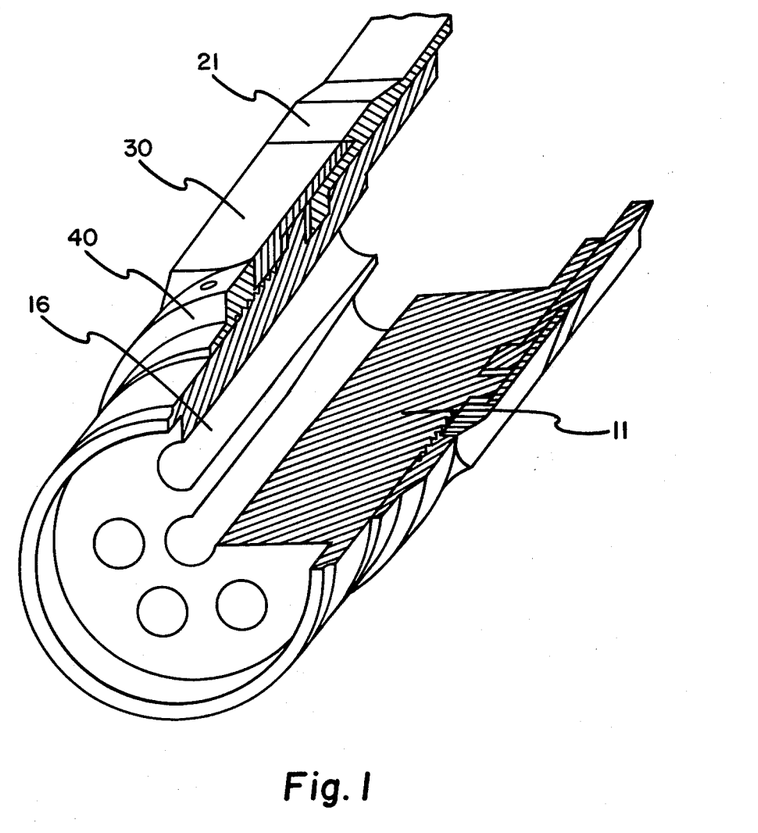
FIG. 1 is a three-dimensional cutaway view of the lower end of a duct tube and the upper end of an inlet nozzle, showing their attachment.
Figure 2:
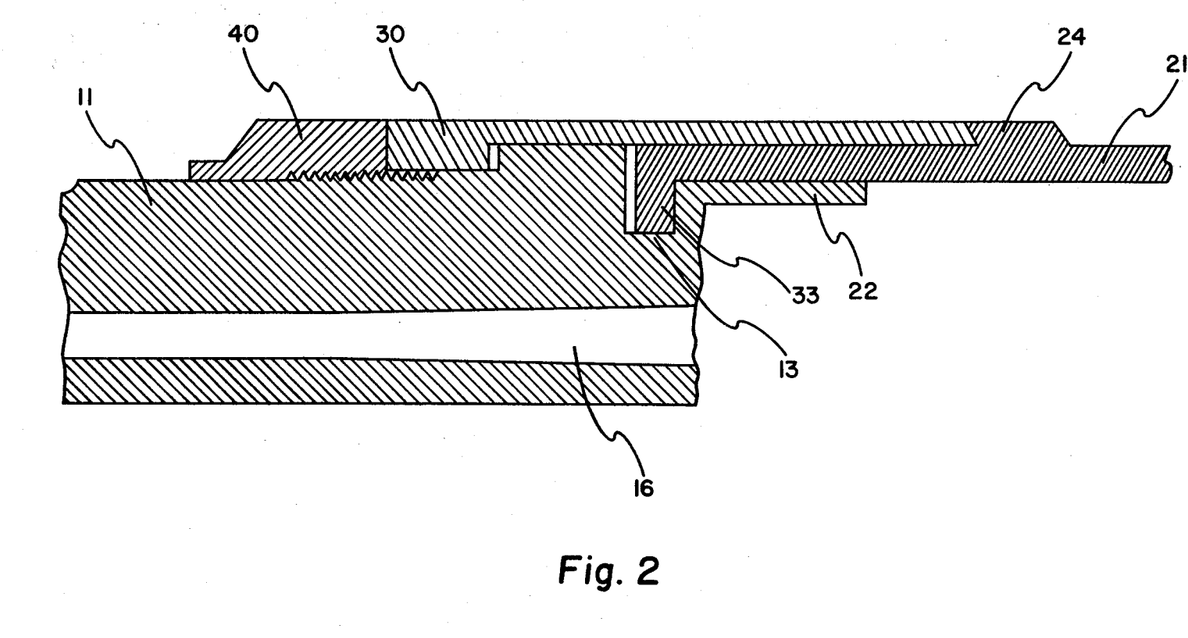
FIG. 2 is a sectional view of FIG. 1.
Figure 3:
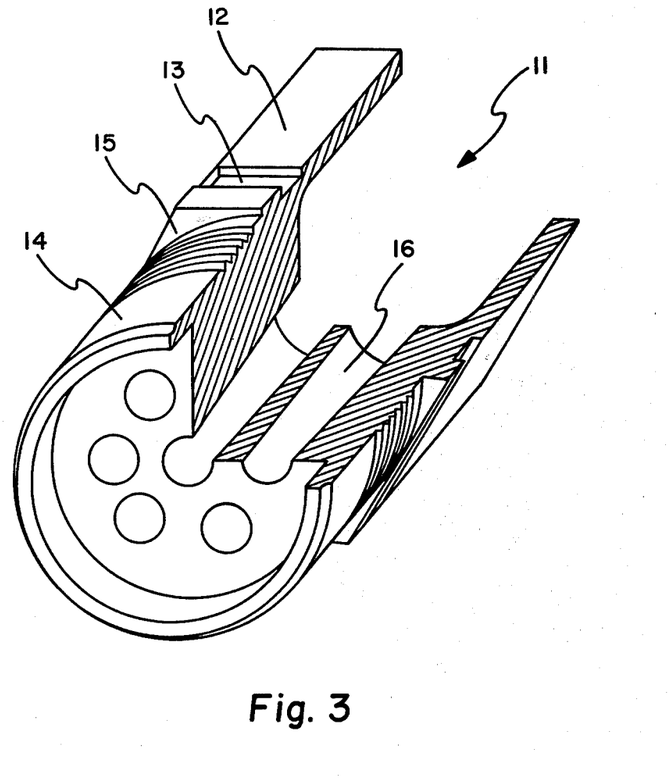
FIG. 3 is an enlarged, partial sectional view of the inlet nozzle's upper end.

The inlet nozzle's upper end 11 is shown in FIGS. 1, 2 and 3. It consists of a top section 12 and bottom section 14. The top section 12 has the shape of generally equilateral polygon, and a hexagonal shape is preferred. Each side of the top section 12 has a recess 13. Preferably the recesses 13 taken together have the shape of a single generally transversely orthogonal, annular groove. The bottom section 14 has a generally cylindrical shape and contains an outside threaded portion 15. The top section 12 is coaxially secured to the bottom section 14, and they may be formed from a single piece of material. Coolant flows through the inlet nozzle's upper end 11 through at least one coolant channel 16.

Figure 4:
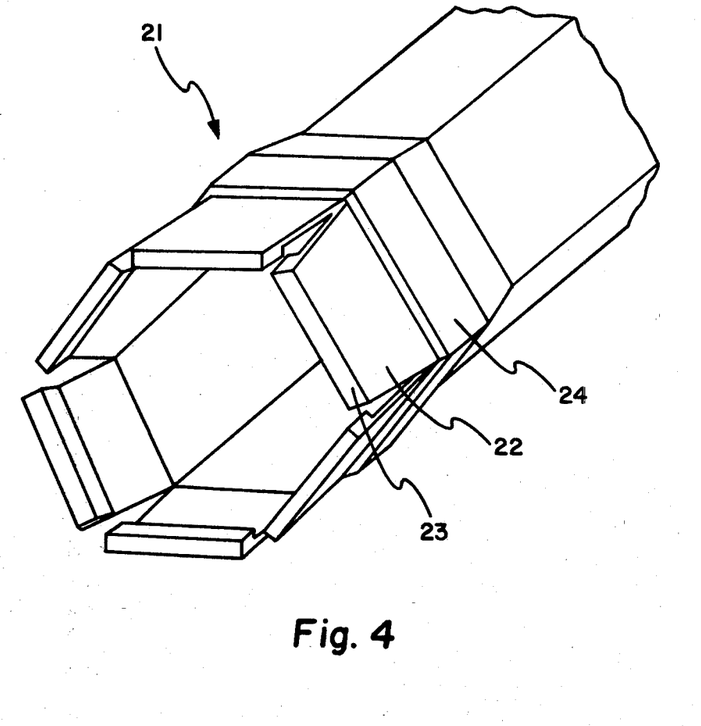
FIG. 4 is an enlarged, perspective view of the duct tube's lower end.

The duct tube's lower end 21 is shown in FIGS. 1, 2 and 4. The lower end 21 has the shape of a generally equilateral polygon which is geometrically similar to (with the same number of equilateral sides as) the polygon shape of the inlet nozzle upper end's top section 12. Preferably the duct tube has a hexagonal shape. Each of the sides of the duct tube's lower end 21 terminates in a locking tab 22 which preferably is as wide as its side. Each locking tab 22 is separated from each other, and ends with an inwardly-extending flange 23, which preferably is perpendicular to its locking tab 22. The locking tabs 22 are deflectable and can be slid over the inlet nozzle's top section 12 to the recesses 13. The flanges 23 are made to mate or engage the recesses 13. The duct tube's lower end 21 also contains an outwardly-extending protrusion 24 on each of its sides adjacent the locking tabs 22. Preferably the protrusions 24 together have the shape of a generally orthogonally transverse, annular band (support collar), each flange 23 has a width equal to that of its locking tab 22 and the locking tabs 22 are generally coaxially aligned with the duct tube during attachment. It is also preferred that the locking tabs 22 are outwardly disposed and resiliently deflectable so that they may be slid on and off the inlet nozzle upper end's top section 12 without locking tab deflection. For attachment, the locking tabs 22 would be deflected inward so that the flanges 23 engage the recesses 13.

Figure 5:
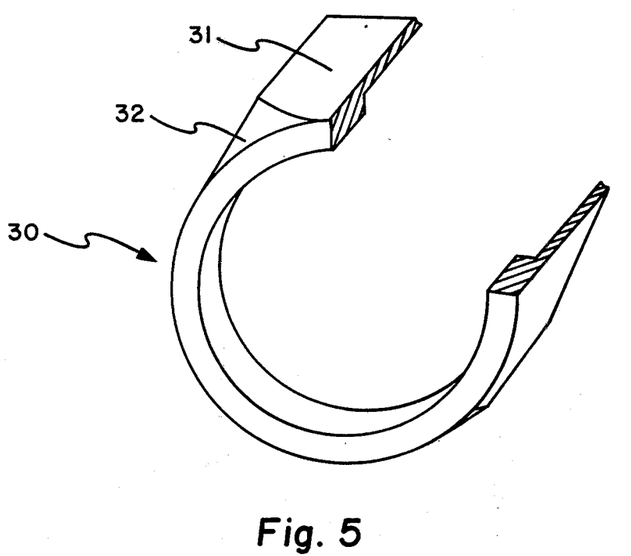
FIG. 5 is an enlarged, partial sectional view of the retaining collar.

The retaining collar 30 is shown in FIGS. 1, 2 and 5. Its purpose is to restrain the flanges 23 in the recesses 13 to permit a secure attachment of the duct tube and inlet nozzle. The retaining collar 30 has a top segment 31 having the shape of a generally equilateral polygon with the same number of sides as the inlet nozzle upper end top section's 12 polygon. The top segment 31 is coaxially connected to the bottom segment 32, and they may be formed from a single piece of material. The top segment 31 surrounds and restrains the flanges 23 in the recesses 13 during attachment. The bottom segment 32 has a generally cylindrical shape and can slide over the inlet nozzle upper end's bottom section 14 to a point above at least part of the outside threaded portion 15 of the inlet nozzle upper end's bottom section 14. The sliding motion of the retaining collar 30 is stopped by the top segment 31 engaging the duct tube's protrusions 24.

Figure 6:
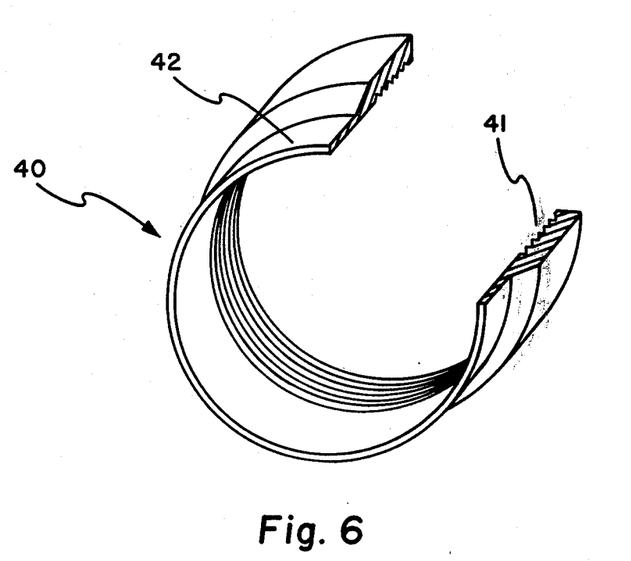
FIG. 6 is an enlarged, partial sectional view of the locking nut.

The locking nut 40 is shown in FIGS. 1, 2 and 6. The locking nut 40 contains an inside threaded portion 41. The locking nut 40 attaches to the inlet nozzle upper end's bottom section 14 to secure the retaining collar 30 against the duct tube's protrusions 24. The locking nut's inside threaded portion 41 engages the inlet nozzle upper end bottom section's outside threaded portion 15 to accomplish this.

Figure 7A:
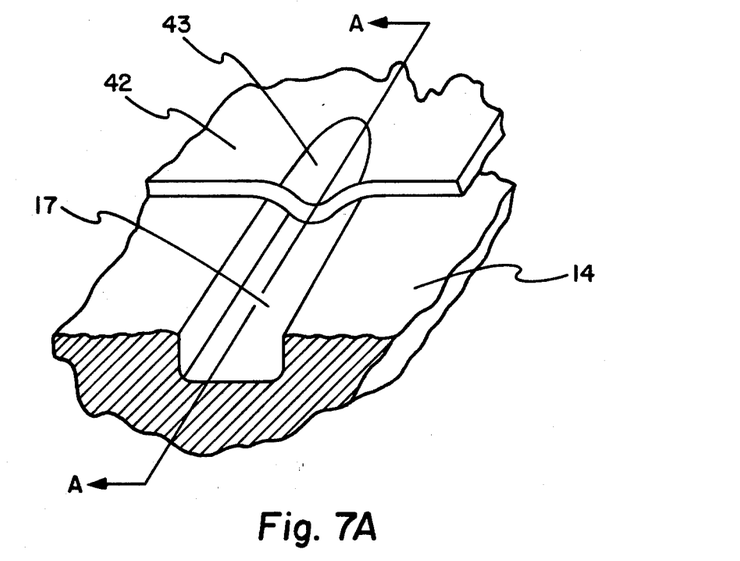
FIG. 7a is a perspective view, and FIG. 7b a cross sectional view, of the swage lock means for preventing back off of the locking nut.
Figure 7B:
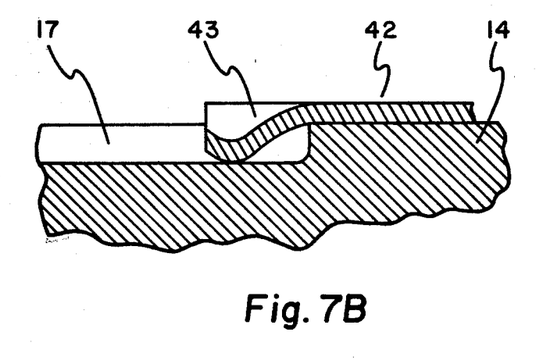
Figure 8A:
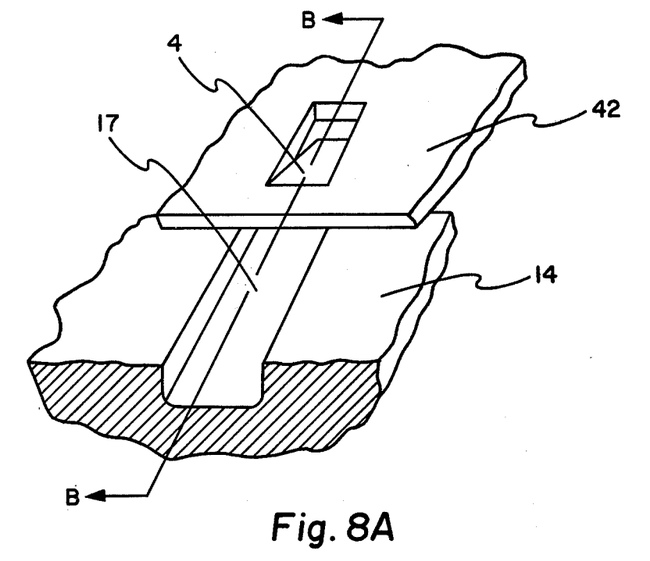
FIG. 8a is a perspective view, and FIG. 8b a cross sectional view, of the cantilever finger lock means of preventing back off of the locking nut.
Figure 8B:
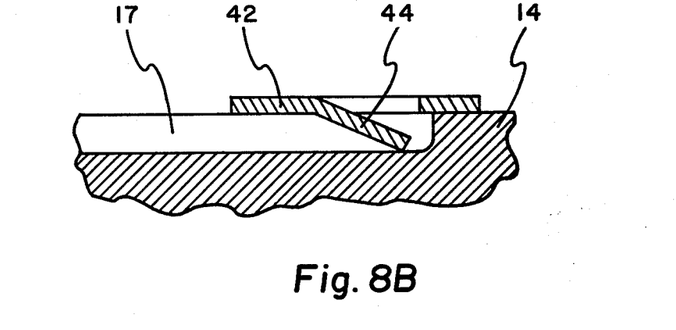

Means to prevent back off of the locking nut 40 are shown in FIGS. 7 and 8. In FIGS. 7a and 7b, the locking nut 40 preferably has a thin terminating annular portion 42 which can be shaped into a standard swage lock 43 to engage a locking groove 17 formed in the bottom section 14 of the inlet nozzle's upper end 11. This is the preferred technique. An alternate technique would be to form the thin annular terminating portion 42 into the shape of a standard cantilever finger lock 44 which would engage the same locking groove 19 on the bottom section 14 of the inlet nozzle's upper end 11 to prevent locking nut 40 back off. This is shown in FIGS. 8a and 8b.

To attach the nuclear reactor fuel assembly duct tube to the nuclear reactor fuel assembly inlet nozzle, the locking tabs 22 are spread apart, or are made to be naturally so disposed, and the duct tube's lower end 21 is slid over the inlet nozzle upper end's top section 12 to the area of the recesses 13. Then the locking tabs 22 are pushed inward until the flanges 23 engage the recesses 13. The locking tabs 22 would be held down until the retaining collar 30 could be slid over the inlet nozzle upper end's top section 12 to restrain the flanges 23 in the recesses 13. Then the locking nut 40 would be slid over the inlet nozzle upper end's bottom section 14 and screwed on the outside threaded portion 15 until the locking nut 40 secured the retaining collar 30 against the duct tube's protrusion 24. For removal, the process would be reversed, and the locking tabs 22 would be deflected apart, if necessary, so that the flanges 23 could clear the recesses 13 to separate the duct tube from the inlet nozzle. The duct tube and inlet nozzle are designed for repeated use. When the preferred means to prevent locking nut 40 back off is used, the attached locking nut 40 would be formed into one or more swage locks 43 engaging their respective locking grooves 19. Removal would require easy breaking of the swage lock 43.

Many locking grooves 19 could be employed so that new swage locks 43 could be formed each time the attachment system is used.

In summary, by using locking tabs 22 on the duct tube, and recesses 13 on the inlet nozzle, a duct tube can be removably attached to an inlet nozzle in a reusable system by securing the locking tabs' flanges 23 in the recesses 13 with a retaining collar 30 and locking nut 40. This provides a reusable, economical, and rapid attachment and removal system for nuclear reactor fuel assembly duct tubes and inlet nozzles.

The foregoing description of a preferred embodiment of the invention has been presented for purposes of illustration and description. It is not intended to be exhaustive or to limit the invention in the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A nuclear reactor fuel assembly duct-tube-to-inlet-nozzle attachment system, comprising:
   (a) a nuclear reactor fuel assembly inlet nozzle having an upper end (11) with a generally equilateral polygonal top section (12) and a generally cylindrical bottom section (14), said top section (12) and said bottom section (14) being coaxially interconnected, said top section (12) with each of its sides having an external recess (13) and said bottom section (14) having an outside threaded portion (15);
   (b) a nuclear reactor fuel assembly duct tube having a generally equilateral polygonal lower end (21), the lower end's (21) polygon shape being similar to the inlet nozzle upper end top section's (12) polygon shape, said lower end (21) with each of its sides having an outwardly-extending protrusion (24), after which each side terminates in a deflectable locking tab (22), said locking tabs (22) slidable over said top section (12) to said recesses (13), each of said locking tabs (22) ending in an inwardly-extending, recess-matching flange (23), said flanges (23) coaxially surrounding and engaging said recesses (13) for attachment of said duct tube's lower end (21) to said inlet nozzle's upper end (11);
   (c) a retaining collar (30) having a flange-restraining, protrusion-engaging, generally equilateral polygonal top segment (31) and a generally cylindrical bottom segment (32), said top segment (31) and said bottom segment (32) being coaxially interconnected, the top segment's (31) polygon shape being similar to the inlet nozzle upper end top section's (12) polygon shape, said top segment (31) slidable over said locking tabs (22) to said protrusions (24) when said flanges (23) engage said recesses (13) during said attachment, said bottom segment (32) slidable over said bottom section (14) to above only part of the outside threaded portion (15), said collar's top segment (31), during said attachment, engaging said protrusions (24), and surrounding and restraining said flanges (23) in said recesses (13); and
   (d) a locking nut (40), engageable with said retaining collar's bottom segment (32), having an inside threaded portion (41) engageable with said outside threaded portion (15) to secure said retaining collar's top segment (31) against said duct tube lower end's protrusions (24) during said attachment.

2. The system of claim 1, wherein the generally equilateral polygon is a generally equilateral hexagon.

3. The system of claim 2, wherein said recesses (13) together have a generally orthogonally transverse, annular groove shape.

4. The system of claim 3, wherein the width of each of said locking tabs (22) is generally equal to the width of one of said top section's (12) sides.

5. The system of claim 4, wherein the width of each of said flanges (23) is equal to the width of one of said locking tabs (22).

6. The system of claim 5, wherein said locking tabs (22) are generally coaxially aligned with said duct tube during said attachment, and wherein each of said flanges (23) is generally perpendicular to its said locking tab (22).

7. The system of claim 6, wherein said protrusions (24) together have a generally orthogonally transverse, annular band shape.

8. The system of claim 7, wherein said locking tabs (22) are outwardly disposed and resiliently deflectable, and wherein said flanges (23) are slidable, without locking tab deflection, over said top section (12) to and from said recesses (13) during attaching and removing of said duct tube and said inlet nozzle shield.

9. The system of claim 8, also including means for preventing the backing off of said locking nut (40) during said attachment.

* * * * *